(12) United States Patent
Fujii et al.

(10) Patent No.: US 10,782,664 B2
(45) Date of Patent: Sep. 22, 2020

(54) PRODUCTION SYSTEM THAT SETS DETERMINATION VALUE OF VARIABLE RELATING TO ABNORMALITY OF PRODUCT

(71) Applicant: FANUC CORPORATION, Yamanashi (JP)

(72) Inventors: Shouta Fujii, Yamanashi (JP); Sou Saitou, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 100 days.

(21) Appl. No.: 15/493,866

(22) Filed: Apr. 21, 2017

(65) Prior Publication Data

US 2017/0308049 A1 Oct. 26, 2017

(30) Foreign Application Priority Data

Apr. 25, 2016 (JP) .................. 2016-087144

(51) Int. Cl.
*G05B 19/042* (2006.01)
*G05B 19/418* (2006.01)
*G05B 13/02* (2006.01)

(52) U.S. Cl.
CPC ..... *G05B 19/0426* (2013.01); *G05B 13/0265* (2013.01); *G05B 19/41875* (2013.01); *G05B 2219/32187* (2013.01); *G05B 2219/32221* (2013.01); *G05B 2219/32334* (2013.01); *G05B 2219/37375* (2013.01); *Y02P 90/14* (2015.11); *Y02P 90/22* (2015.11)

(58) Field of Classification Search
CPC ............ G05B 19/0426; G05B 13/0265; G05B 19/41875; G05B 2219/32187; G05B 2219/32221; G05B 2219/32334; G05B 2219/37375; Y02P 90/14; Y02P 90/22
See application file for complete search history.

(56) References Cited

U.S. PATENT DOCUMENTS

| 5,142,612 | A | 8/1992 | Skeirik |
| 6,281,465 | B1 | 8/2001 | Muller et al. |
| 6,862,484 | B2 | 3/2005 | Hayashi |

(Continued)

FOREIGN PATENT DOCUMENTS

| CN | 1655325 A | 8/2005 |
| CN | 101954638 A | 1/2011 |

(Continued)

*Primary Examiner* — Thomas C Lee
*Assistant Examiner* — Michael Tang
(74) *Attorney, Agent, or Firm* — RatnerPrestia (57) ABSTRACT

A production system includes a cell control apparatus that is connected to a machine control apparatus and an inspection control apparatus. The cell control apparatus includes a storage part that stores data on a state of the manufacturing machine, data on an environment state, and data on an inspection result of a product. The cell control apparatus includes a correlation analysis part that selects a variable relating to an abnormality based on a correlation between the inspection result of the product, and the data on the state of the manufacturing machine and the data on the environment state when the abnormality occurs in the inspection result, and a determination value setting part that sets a determination value of the variable relating to the abnormality.

2 Claims, 4 Drawing Sheets

(56) References Cited

U.S. PATENT DOCUMENTS

| | | | |
|---|---|---|---|
| 7,463,941 B2 | 12/2008 | Ogawa et al. | |
| 9,323,234 B2* | 4/2016 | Zhou | G05B 13/048 |
| 9,396,443 B2* | 7/2016 | Kaushal | G06N 99/005 |
| 2002/0069024 A1* | 6/2002 | Dor | G06Q 30/02 |
| | | | 702/82 |
| 2005/0159835 A1* | 7/2005 | Yamada | G06Q 10/06 |
| | | | 700/109 |
| 2006/0155660 A1 | 7/2006 | Koshizen et al. | |
| 2006/0281199 A1* | 12/2006 | Matsushita | H01L 22/20 |
| | | | 438/14 |
| 2007/0180324 A1* | 8/2007 | Nakamura | G05B 23/024 |
| | | | 714/37 |
| 2008/0059839 A1* | 3/2008 | Hamilton | G05B 23/0251 |
| | | | 714/26 |
| 2009/0009741 A1* | 1/2009 | Okita | G03F 7/70516 |
| | | | 355/53 |
| 2009/0276075 A1 | 11/2009 | Good et al. | |
| 2017/0227673 A1* | 8/2017 | Venugopalan | G01N 21/314 |

FOREIGN PATENT DOCUMENTS

| | | | |
|---|---|---|---|
| CN | 102402712 A | | 4/2012 |
| CN | 102402712 A | * | 4/2012 |
| CN | 103324085 A | | 9/2013 |
| CN | 103324085 A | * | 9/2013 |
| DE | 29617200 U1 | | 12/1997 |
| DE | 69128071 T2 | | 5/1998 |
| DE | 19743600 A1 | | 4/1999 |
| DE | 102008021557 A1 | | 11/2009 |
| JP | H-05-12302 A | | 1/1993 |
| JP | 2002318617 A | | 10/2002 |
| JP | 2003287214 A | | 10/2003 |
| JP | 2006155128 A | | 6/2006 |
| JP | 2006293433 A | | 10/2006 |
| JP | 2007258731 A | | 10/2007 |
| JP | 2008117380 A | | 5/2008 |
| WO | 02063402 A1 | | 8/2002 |

* cited by examiner

PRODUCTION SYSTEM THAT SETS DETERMINATION VALUE OF VARIABLE RELATING TO ABNORMALITY OF PRODUCT

BACKGROUND OF THE INVENTION

1. Field of the Invention

The present invention relates to a production system including a manufacturing machine that manufactures a product.

2. Description of the Related Art

In conventional techniques, it has been known to manufacture a product by a manufacturing machine such as a robot and a machine tool. It has been known that in manufacturing factories, operations such as machining and conveyance of a component are performed by a manufacturing machine, whereby productivity is improved. In the manufacturing factories, different types of manufacturing machines may be used, and a plurality of identical manufacturing machines may be used. When a plurality of manufacturing machines are used, the plurality of manufacturing machines share the operations to manufacture a product.

Japanese Unexamined Patent Publication No. H5-12302 discloses an apparatus that automatically resets a reference value relating to production in the manufacturing industry. It is disclosed that this apparatus changes the reference value contained in a management table that manages the result of the performance in a manufacturing site based on the result information such as a working time and an operation time of a facility in the manufacturing site.

SUMMARY OF THE INVENTION

In a product manufacturing process, there is an inspection process in which an inspection of a product in which the operations have been performed by the manufacturing machines is performed. In the inspection process, halfway of or at a final process of the manufacturing process, an inspection device performs a product inspection. In this regard, when a product inspection is performed in a predetermined manufacturing process, an inspection is performed with respect to a minimum required item. In other words, an inspection is not performed with respect to all conceivable items, but an inspection is performed with respect to a selected item. Consequently, there are cases in which by the inspection in the manufacturing process, an abnormality fails to be detected even when the abnormality occurs in a product. When a part at which a manufacturing defect occurs is unrelated to the inspection item, an abnormality is not detected by the inspection device and an advance to the subsequent manufacturing process is made.

On the other hand, in designing a product, a reference for a variable (parameter) that can be detected in the manufacturing process can be provided. However, there are a large number of variables that can be detected in the inspection process. Consequently, with respect to many variables that can be detected, a determination value is not provided, and an inspection is not performed. Further, when a relationship between a parameter that can be detected in the inspection process and a occurrence of a product defect is unknown, providing a determination value is difficult.

A production system of the present invention includes a manufacturing machine that manufactures a product made of a plurality of components. The production system includes a machine state detector that detects a state of the manufacturing machine, an environment state detector that detects an environment state around the manufacturing machine, and an inspection device that inspects the product as manufactured by the manufacturing machine. The production system includes a manufacturing management apparatus that is connected to a control apparatus of the manufacturing machine and a control apparatus of the inspection device. The manufacturing management apparatus includes a storage part that stores data on the state of the manufacturing machine, data on the environment state, and data on an inspection result of the product. The manufacturing management apparatus includes a correlation analysis part that selects a variable relating to an abnormality based on a correlation between the inspection result of the product, and the data on the state of the manufacturing machine and the data on the environment state when the abnormality occurs in the inspection result. The manufacturing management apparatus includes a determination value setting part that sets a determination value of the variable relating to the abnormality.

In the invention as described above, the determination value setting part can be configured so as to update the determination value by reinforcement learning. The determination value setting part can include a state observation part that obtains the data on the state of the manufacturing machine, the data on the environment state, and the inspection result of the product, and a reward calculation part that sets a reward when the determination value is set based on the data on the state of the manufacturing machine, data on the environment state, and the inspection result of the product. The determination value setting part can include a function update part that updates an action evaluation function based on the data obtained by the state observation part and the reward calculated by the reward calculation part.

In the invention as described above, the determination value setting part can include a decision-making part that sets the determination value of the variable based on the evaluation function updated by the function update part.

In the invention as described above, an external storage device that is connected to the manufacturing management apparatus via a network can be included. The external storage device can be configured so as to be capable of storing another data different from the data on the state of the manufacturing machine, the data on the environment state, and the data on the inspection result of the product. The determination value setting part can set the determination value of the variable based on another data.

DETAILED DESCRIPTION

Referring to FIG. 1 to FIG. 5, a production system according to an embodiment will be described. In the production system according to the present embodiment, a predetermined product is manufactured by a plurality of manufacturing machines. Such a product is made of a plurality of components. Then, a product inspection is performed halfway of or at a final process of a manufacturing process.

Figure 1:
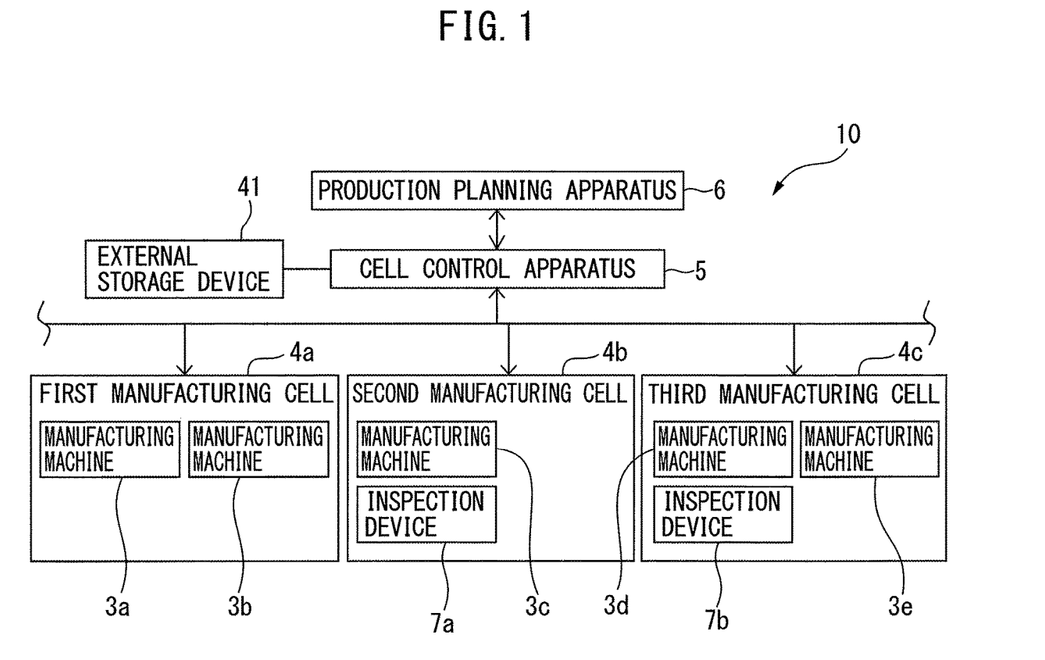
FIG. 1 is a block diagram of a production system according to an embodiment.

FIG. 1 is a block diagram of the production system according to the present embodiment. A production system 10 includes a plurality of manufacturing cells 4a, 4b, 4c. In an example as illustrated in FIG. 1, the production system 10 includes the first manufacturing cell 4a, the second manufacturing cell 4b, and the third manufacturing cell 4c. The manufacturing cells are a set for performing predetermined operations. The manufacturing cells can be set by an optional method. For example, similar operations are collected so that one manufacturing cell is set. Alternatively, when operations are arranged in an order of operation processes, partition is performed so that each operation time corresponds to a predetermined time and the manufacturing cells are set.

The manufacturing cells 4a, 4b, 4c include at least one of a manufacturing machine and an inspection device. In the present embodiment, the first manufacturing cell 4a includes manufacturing machines 3a, 3b. The second manufacturing cell 4b includes a manufacturing machine 3c and an inspection device 7a. The third manufacturing cell 4c includes manufacturing machines 3d, 3e and an inspection device 7b. Examples of the manufacturing machines 3a to 3e include a machine tool that cuts a component, a robot that performs a predetermined operation such as component attachment and welding a printing machine, and the like. Further, examples of the inspection device include a device that performs a predetermined inspection such as a device that measures a size of the product, a device that photographs the product and performs an appearance inspection, a device that inspects a function of the product, or the like.

The production system 10 includes a cell control apparatus 5 serving as a manufacturing management apparatus that controls the manufacturing cells 4a, 4b, 4c. The cell control apparatus 5 includes an arithmetic processing device including a CPU (central processing unit), a RAM (random access memory), a ROM (read only memory), and the like that are connected via a bus.

The production system 10 includes a production planning apparatus 6 that sets a manufacturing plan of the product. The production planning apparatus 6 is configured so as to be capable of communicating with the cell control apparatus 5. The production planning apparatus 6 in the present embodiment manages production of the product in the entirety of a factory.

In the present embodiment, the manufacturing cells 4a, 4b, 4c are installed in the factory that manufactures the product. On the other hand, the cell control apparatus 5 and the production planning apparatus 6 may be installed in a building different from the factory. For example, the cell control apparatus 5 may be installed in a separate building inside the site of the manufacturing factory. In this case, the cell control apparatus 5 and the manufacturing cells 4a, 4b, 4c may be connected via, for example, a network such as an intranet. Further, the production planning apparatus 6 may be installed in an office located in an area distant from the manufacturing factory. The production planning apparatus 6 is connected to the cell control apparatus 5 so as to be communicable with each other via, for example, a network such as an internet.

Figure 2:
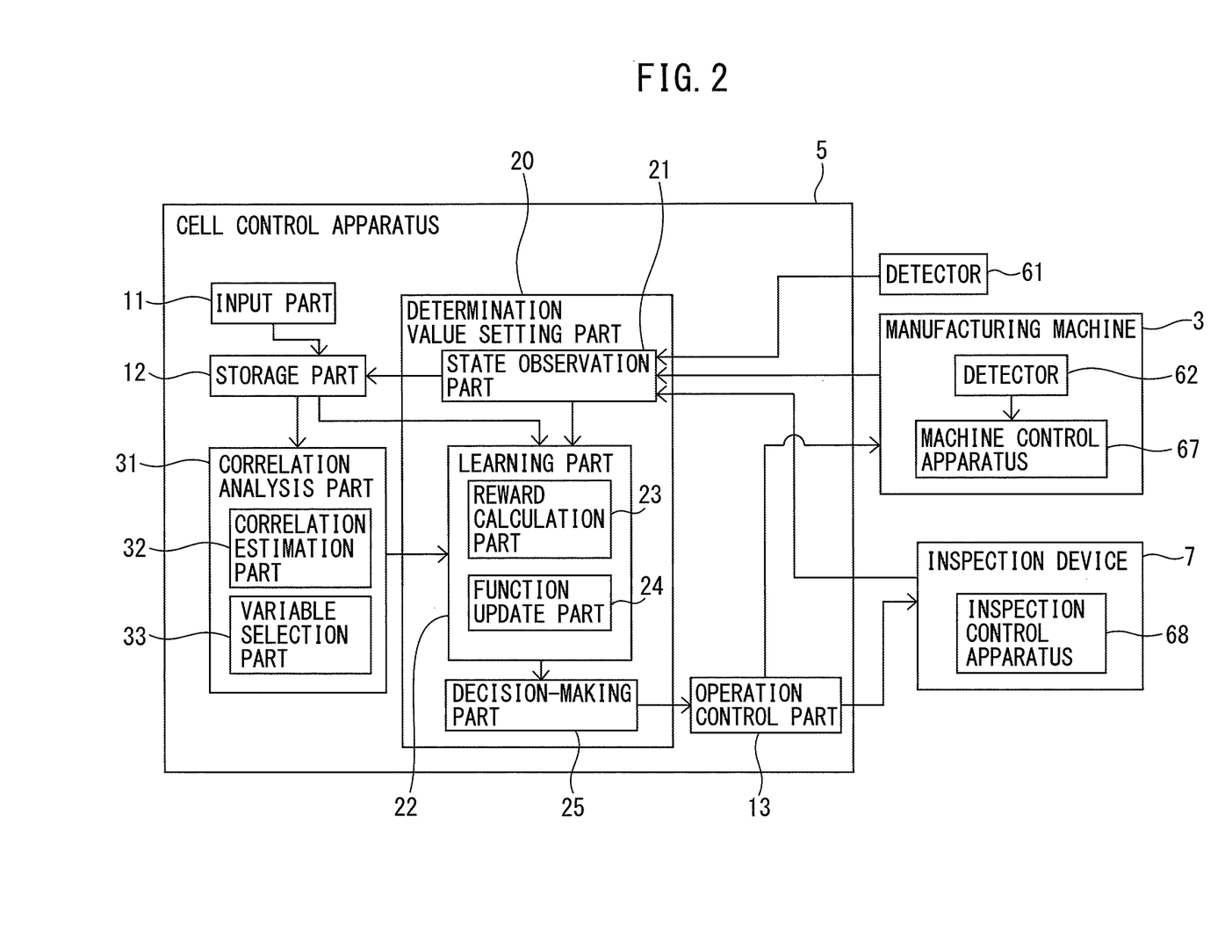
FIG. 2 is a block diagram of a cell control apparatus of the production system according to the embodiment.

In FIG. 2, a block diagram of the cell control apparatus according to the present embodiment is illustrated. In FIG. 2, one manufacturing machine 3 is illustrated from among the plurality of manufacturing machines 3a to 3e. Each of the manufacturing machines 3a to 3e has a configuration similar to that of the manufacturing machine 3. Further, in FIG. 2, one inspection device 7 is illustrated from the inspection devices 7a, 7b. Each of the inspection devices 7a, 7b has a configuration similar to that of the inspection device 7.

Each manufacturing machine 3 includes a machine control apparatus 67 that controls the manufacturing machine. The manufacturing machine 3 includes a detector 62 serving as a machine state detector that detects a state of the manufacturing machine. For example, when the manufacturing machine is a robot, a state of the robot includes a position and a posture of the robot, a current, a voltage, a rotation speed, a temperature, vibrations, a frequency of sounds, and an output torque that are related to a motor for driving an arm of the robot, and the like. Further, the state of the robot includes a variable that changes due to an operation of the robot. For example, a load, a strain, vibration and the like applied to a working table or a jig by an operation of the robot are included. Further, the state of the robot includes transmission of an alarm about an overload of the motor, and the like. In addition, the state of the robot may include a voltage applied to the product by the inspection device, and the like.

The cell control apparatus 5 is configured so as to be mutually communicable with the machine control apparatus 67. The detector 62 is connected to the machine control apparatus 67. The cell control apparatus 5 obtains an operation state of the manufacturing machine 3 from the machine control apparatus 67 and transmits an operation command to the machine control apparatus 67.

Each inspection device 7 inspects the product manufactured by the manufacturing machine 3. The inspection device 7 includes an inspection control apparatus 68 that controls the inspection device. The cell control apparatus 5 is configured so as to be mutually communicable with the inspection control apparatus 68. The cell control apparatus 5 obtains an inspection result from the inspection control apparatus 68 and transmits an inspection execution command.

Note that, the production planning apparatus 6, the machine control apparatus 67 provided to the manufacturing machine 3, and the inspection control apparatus 68 provided to the inspection device 7 according to the present embodiment are configured by a arithmetic processing device including a CPU, a RAM, and the like.

The production system 10 includes a detector 61 serving as an environment state detector that is disposed in the interior of the manufacturing cells 4a, 4b, 4c or around the manufacturing cells and detects an environment state around the manufacturing machine. As the environment state around the manufacturing machine, a time, a temperature, humidity, noise, vibration, an atmospheric pressure, magnetism, an altitude, and the like are included. For the detector 61, a sensor that can detect a variable indicating the environment state is selected. For example, when a temperature around the manufacturing machine is obtained, a temperature sensor is disposed as the detector 61 around the manufacturing machine. The cell control apparatus 5 receives a signal outputted from the detector 61. In other words, the cell control apparatus 5 obtains data on the environment state around the manufacturing machine 3.

The operator can dispose in advance the machine state detector that detects the state of the manufacturing machine and the environment state detector that detects the environment state around the manufacturing machine. The operator can provide various types of detectors 62 to the manufacturing machine 3 so that various pieces of data on the states of the manufacturing machines can be detected. For example, in addition to a detector that detects a value of current supplied to the motor, and the like, the operator can provide a vibration detector that detects vibration of the motor, a temperature sensor that detects a temperature of the motor, a detector that detects a frequency of sounds emitted from the motor, and the like.

Further, the operator can provide the detector 61 so that the environment state around the manufacturing machine can be detected. For example, the operator can provide a temperature sensor that measures a temperature in the interior of the factory, a humidity sensor that detects humidity in the interior of the factory, and the like. In addition, an output from detectors as already provided may be employed as data on the state of the manufacturing machine or data on the environment state around the manufacturing machine.

The cell control apparatus 5 includes a storage part 12 that stores information relating to a control of the manufacturing cells 4a to 4c. Further, the cell control apparatus 5 includes an input part 11 for inputting desired information by the operator. Information inputted through the input part 11 by the operator is stored in the storage part 12. The cell control apparatus 5 includes an operation control part 13 that transmits an operation command to the machine control apparatus 67 of the manufacturing machine 3. Further, the operation control part 13 transmits an inspection execution command to the inspection control apparatus 68 of the inspection device 7.

The cell control apparatus 5 according to the present embodiment selects a variable relative to an occurrence of an abnormality when the abnormality of the product is detected by the inspection device 7. The variable herein includes a variable relating to the state of the manufacturing machine and a variable relating to the environment state around the manufacturing machine. For example, the variable includes a current value of the motor that drives the arm of the robot, a rotation speed of the motor, a temperature around the manufacturing machine, humidity around the manufacturing machine as described above, and the like. Then, the cell control apparatus 5 sets a determination value of the variable relative to the occurrence of the abnormality. Further, the cell control apparatus 5 updates the determination value of the variable based on a state obtained when manufacturing of the product is repeated.

The cell control apparatus 5 includes a correlation analysis part 31 that selects a variable relating to an occurrence of an abnormality. The correlation analysis part 31 includes a correlation estimation part 32 that determines whether or not there is a correlation between the inspection result of the product, and a variable of the state of the manufacturing machine and the variable of the environment state. The correlation analysis part 31 includes a variable selection part 33 that selects a variable for setting a determination value from variables determined to have the correlation by the correlation estimation part 32.

A state observation part 21 obtains data on the state of the manufacturing machine when manufacturing of the product is performed, data on the environment state, and data on the inspection result of the product. The state observation part 21 obtains a value of a variable that can be obtained. The storage part 12 stores data on each state. The storage part 12 can store values of a plurality of variables each time one product is manufactured.

Herein, a manufacturing process in which a printed circuit board is assembled will be described by way of example. In a process of assembling the printed circuit boards, a component is fitted to the printed circuit board and screw fastening is performed while the robot holds the printed circuit board. The robot holds the circuit board so that a strain occurs in the printed circuit board. As one of pieces of data on the state of the robot, an amount of strain applied to the printed circuit board can be detected. The operator mounts a strain sensor in advance on the printed circuit board. The state observation part 21 detects an amount of strain of the printed circuit board.

Referring to FIG. 1 and FIG. 2, for example, in the first manufacturing cell 4a, an operation of mounting a component on the printed circuit board is performed. A first robot serving as the manufacturing machine 3a holds the printed circuit board. A second robot as the manufacturing machine 3b fits a plurality of components to the printed circuit board. For example, the second robot performs an operation of mounting a connector on the printed circuit board. In the second manufacturing cell 4b, after the manufacturing machine 3c performs another operation, the inspection device 7a performs an appearance inspection. The inspection device 7a includes, for example, a photography device that photographs an appearance of the product. The inspection device 7a performs processing of an image as captured, thereby it is determined whether or not damage occurs in the printed circuit board and the components disposed on the printed circuit board. In the example herein, the inspection device 7a detects detachment or breakage of an electronic component disposed on the printed circuit board.

The correlation analysis part 31 according to the present embodiment performs a correlation analysis. The correlation estimation part 32 of the correlation analysis part 31 obtains from the storage part 12 each variable when the product is normal. For example, the correlation estimation part 32 calculates a latest average value of a predetermined number of variables. The correlation estimation part 32 obtains from the storage part 12 a variable relating to the state of the manufacturing machine and a variable relating to the environment state when the printed circuit board in which an electronic component is detached or broken is machined.

The correlation estimation part 32 extracts a variable distant from an average value of past normal values with respect to each variable when the printed circuit board in which an abnormality occurs is manufactured. For example, the correlation estimation part 32 calculates a variance that is a square of a value in which the average value is subtracted from a variable at the time when the printed circuit board in which the abnormality occurs is manufactured. The variable selection part 33 selects a variable relating to the abnormality of the printed circuit board from among variables having a large variance. For example, the variable selection part 33 can determine that a variable having the largest variance is the variable relating to the abnormality. Alternatively, the variable selection part 33 may select a variable having a variance larger than a predetermined determination value as the variable relating to the abnormality.

Herein, in the manufacturing process of the printed circuit board in which an electronic component is detached or broken, a case in which an amount of strain applied to the printed circuit board is the most distant away from an average value is exemplified. The correlation analysis part 31 selects the amount of strain applied to the printed circuit board as the variable relating to the abnormality. In other words, the correlation analysis part 31 determines that the amount of strain occurring in the printed circuit board is large, and thus an electronic component is detached or broken.

Note that, in the above description, the variable selection part extracts a variable distant from an average value of past normal values when the product in which an abnormality occurs is manufactured, but the present invention is not limited to this aspect, and for example, a reference value of a variable when the product is normal may be determined in advance. Then, the correlation analysis part may select a variable distant from the reference value as a variable relating to an occurrence of an abnormality.

Next, the cell control apparatus 5 sets a determination value for the variable selected by the correlation analysis part 31. The cell control apparatus 5 includes a determination value setting part 20 that sets the determination value of the variable relating to the abnormality. The determination value setting part 20 can optionally set an initial value of the determination value of the variable. The determination value setting part 20 according to the present embodiment updates the determination value by the machine learning.

The determination value setting part 20 according to the present embodiment has functions of analytically extracting a useful rule, a knowledge representation, a criterion for judgment or the like from a set of data as inputted, outputting a result of the judgment, and performing knowledge learning (machine learning). The techniques of the machine learning are various and are broadly classified as, for example, "supervised learning", "unsupervised learning", and "reinforcement learning". Further, there is a technique referred to as "deep learning" that learns extraction of a feature value per se in order to realize these techniques.

Note that the determination value setting part 20 as illustrated in FIG. 2 is that to which "reinforcement learning" is applied. Such a machine learning device (determination value setting part 20) can use a general purpose calculating machine or a processor as well, but when, for example, GPGPU (General-Purpose computing on Graphics Processing Units), large-scale PC clusters or the like is applied, the processing at a higher speed is enabled.

First, supervised learning is a model (error model) in which supervised data, i.e., a large quantity of data sets of certain input and results (labels) is provided to the determination value setting part so as to learn features in the data sets and infer the results from the input, in other words, in which a relationship thereof is acquired recursively. For example, realization can be made using an algorithm such as a neural network as described below.

Further, unsupervised learning is a technique in which large pieces of input data alone is provided to the learning device so as to learn how the pieces of input data are distributed and to perform learning with the device that performs compression, sorting, shaping or the like with respect to the input data without providing corresponding teacher output data. For example, similar features in the data sets can be clustered, and the like. It is possible to achieve prediction of output using this result and by performing allocation of output so that some criteria are provided so as to optimize the result.

Note that, as problem setting intermediate between unsupervised learning and supervised learning, there is one referred to as semi-supervised learning. This corresponds to a case, for example, in which there is a set of data on input and output only in some, and there is data on input alone in the remainder. In the present embodiment, by using data (simulation data and the like) that can be obtained without actually operating the cell control apparatus in unsupervised learning, it is possible to perform learning efficiently.

Next, reinforcement learning will be described further in detail. First, a problem of reinforcement learning is set as follows.

The cell control apparatus observes a state of environment and determines action.

Environment changes according to some rule, and further, one's own action may change the environment.

A reward signal returns each time action is performed.

It is the sum of rewards over the future that is desired to be maximized.

Learning starts from a state in which the result caused by action is not known at all or is only incompletely known. In other words, the cell control apparatus can acquire the result as data only after it actually operates for the first time. In short, it is needed to explore the optimum action by trial and error.

With a state in which prior learning (a technique, such as supervised learning as described above or inverse reinforcement learning) is performed so as to mimic a human movement being as the initial state, learning may be started from a good starting point.

Herein, reinforcement learning is a method for learning appropriate action based on the interaction provided by action to environment not only by determination or sorting but also by learning action, i.e., for learning in order to maximize the reward obtained in future. Hereinafter, for example, description is continued with respect to the case of Q-learning, but there is no limitation to Q-learning.

The Q-learning is a method for learning a value Q(s, a) that selects action a in certain environmental state s. In other words, under the certain state s, the action a having the highest value Q(s, a) may be selected as the optimum action. However, first, the correct value for the value Q(s, a) is completely not known for a combination of the state s and the action a. Accordingly, an agent (action subject) selects various actions under the certain state s and a reward is given for the action a at that time. In this case, the agent selects a better action, i.e., proceeds to learn the correction value Q(s, a).

Further, as a result of action, it is desired to maximize the sum of the reward obtained in future, and thus, it is aimed to make $Q(s, a) = E[\Sigma(\gamma^t) r_t]$ finally. Herein, the expected value is determined to be taken when the state varies in accordance with the optimum action, and since it is not known, it is preferable to learn while making exploration. An update equation for such value Q(s, a) can, for example, be represented by equation (1) as follows:

$$Q(s_t, a_t) \leftarrow Q(s_t, a_t) + \alpha \left( r_{t+1} + \gamma \max_a Q(s_{t+1}, a) - Q(s_t, a_t) \right) \quad (1)$$

In the above equation (1), $s_t$ represents a state of the environment at a time t, and $a_t$ represents an action at the time t. The action $a_t$ changes the state to $s_{t+1}$. The $r_{t+1}$ represents a reward that can be gained via the change of the state. Further, the term with max is the Q-value multiplied by γ for the case where the action a for the highest Q-value known at that time is selected under the state $s_{t+1}$. Herein, γ is a parameter of 0<γ≤1, and referred to as discount rate. Further, α is a learning factor, which is in the range of 0<α≤1.

The above equation (1) represents a method for updating the evaluation value $Q(s_t, a_t)$ of the action $a_t$ in the state $s_t$ on the basis of the reward $r_{t+1}$ that has returned as a result of the action $a_t$. In other words, it is indicated that when the evaluation value $Q(s_{t+1}, \max a_{t+1})$ of the best action max a in the next state based on reward $r_{t+1}$ and action a is larger than the evaluation value $Q(s_t, a_t)$ of the action a in the state s, $Q(s_t, a_t)$ is increased, whereas when the evaluation value $Q(s_{t+1}, \max a_{t+1})$ of the best action max a in the next state based on reward $r_{t+1}$ and action a is smaller than the evaluation value $Q(s_t, a_t)$ of the action a in the state s, $Q(s_t, a_t)$ is decreased. In other words, it is configured so that the value of the certain action in the certain state is made to be closer to the reward that instantly comes back as a result and to the value of the best action in the next state based on that action.

Herein, methods of representing Q(s, a) on a computer includes a method in which the value is retained as a table for all state-action pairs (s, a) and a method in which a function is used in order to approximate Q(s, a) is prepared. In the latter method, the above equation (1) can be implemented by adjusting parameters of the approximation function by a technique, such as stochastic gradient descent method. Note that the approximation function may use a neural network as described below.

Figure 3:
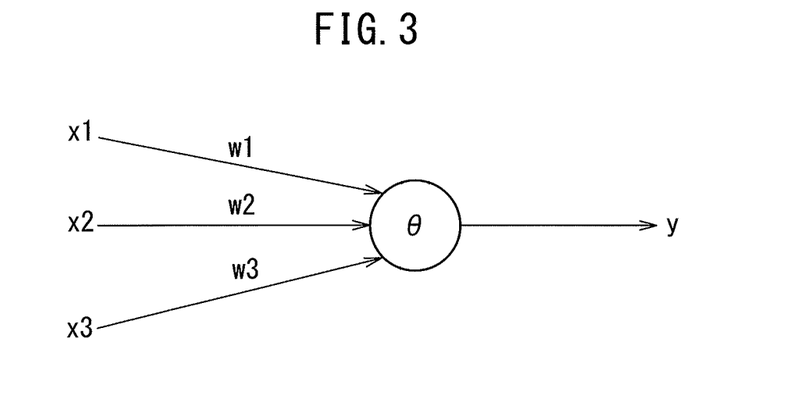
FIG. 3 is a diagram schematically illustrating a model of a neuron.
Figure 4:
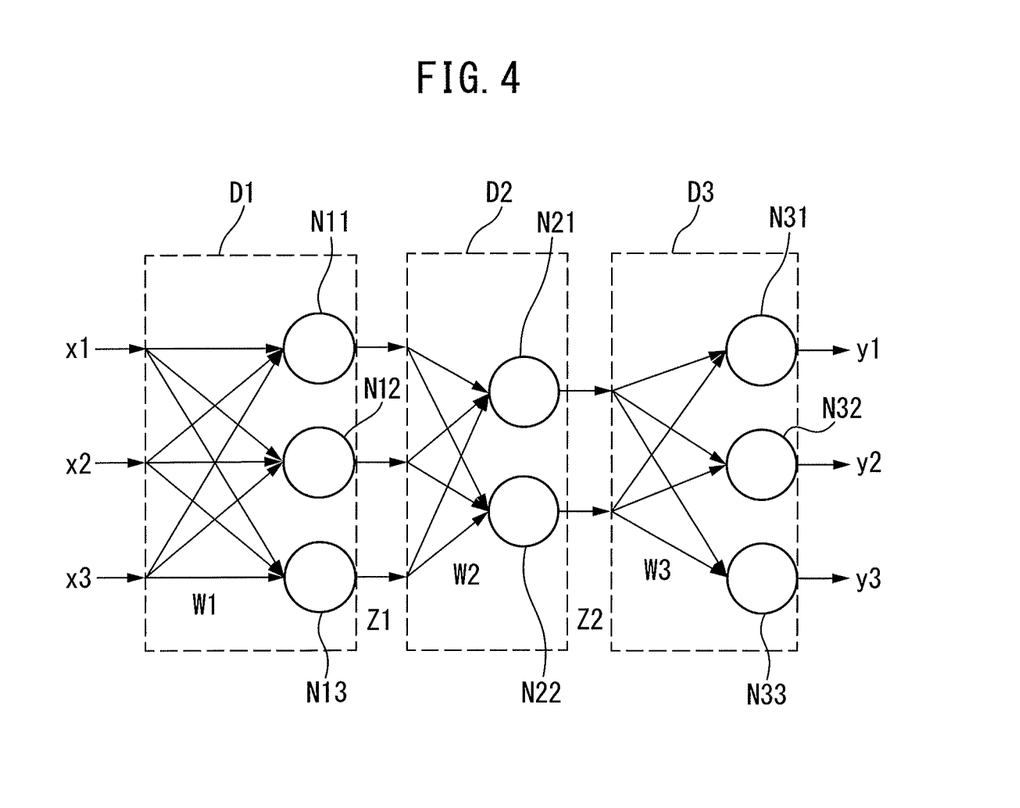
FIG. 4 is a diagram schematically illustrating a three-layer neural network configured by combining neurons.

Herein, in an approximation algorithm for a value function in reinforcement learning, a neural network can be used. FIG. 3 is a diagram schematically illustrating a model of a neuron, and FIG. 4 is a diagram schematically illustrating a three-layer neural network configured by combining neurons illustrated in FIG. 3. In other words, the neural network is configured, for example, of an arithmetic unit, a memory, and the like that imitate a model of a neuron as illustrated in FIG. 3.

As illustrated in FIG. 3, the neuron outputs an output (result) y for a plurality of inputs x (in FIG. 3, by way of example, inputs x1 to x3). Each of the inputs x (x1, x2, x3) is multiplied by a weights w (w1, w2, w3) corresponding to the inputs x. Thereby, the neuron outputs the result y represented by the following equation (2). Note that the input x, the result y, and the weight w all are vectors. Further, in the below equation (2), θ is a bias, and $f_k$ is an activation function.

$$y = f_k(\Sigma_{i=1}^{n} x_i w_i - \theta) \quad (2)$$

Referring to FIG. 4, a description will be given of a three-layer neural network that is obtained by combining neurons as illustrated in FIG. 3. As illustrated in FIG. 4, a plurality of inputs x (by way of example herein, input x1 to input x3) are inputted from the left hand side of the neural network, and a results y (by way of example herein, results y1 to result y3) are outputted from the right hand side. Specifically, the inputs x1, x2, x3 are multiplied by a corresponding weight and the multiplied inputs are inputted to each of the three neurons N11 to N13. The weights multiplied to these inputs are collectively indicated by W1.

The neurons N11 to N13 output z11 to z13, respectively. In FIG. 4, such z11 to z13 are collectively represented as a feature vector Z1, and can be regarded as a vector from which the feature value of the input vector is extracted. This feature vector Z1 is a feature vector between the weight W1 and the weight W2. The z11 to z13 are multiplied by a corresponding weight and the multiplied vectors are inputted to each of the two neurons N21 and N22. The weights multiplied to these feature vectors are collectively represented as W2.

The neurons N21 and N22 output z21 and z22, respectively. In FIG. 4, such z21, z22 are collectively represented as a feature vector Z2. The feature vector Z2 is a feature vector between the weight W2 and the weight W3. The z21 and z22 are multiplied by a corresponding weight and the multiplied vectors are inputted to each of the three neurons N31 to N33. The weights multiplied to these feature vectors are collectively represented as W3.

Finally, the neurons N31 to N33 output result y1 to result y3, respectively. The operation of the neural network includes a learning mode and a value prediction mode. For example, in the learning mode, the weight W is learned using a learning data set, and in the prediction mode, the action decision of the cell control apparatus is performed using the parameters. Note that reference is made to prediction for convenience, but it is needless to say that various tasks, such as detection, classification, inference, and the like, are possible.

Herein, it is possible that the cell control apparatus can be actually operated in the prediction mode so as to instantly learn and cause the resulting data to be reflected in the subsequent action (on-line learning) and also can use a group of pre-collected data so as to perform collective learning and implement a detection mode with the parameter subsequently for quite a while (batch learning). An intermediate case is also possible, where a learning mode is sandwiched each time certain pieces of data are accumulated.

Further, the weights W1 to W3 can be learned by an error back propagation method. Note that the error information enters from the right hand side and flows to the left hand side. The error back propagation method is a technique for adjusting (leaning) each weight so as to make small the difference between an output y when an input x is inputted and a true output y (teacher) for each neuron. Such a neural network can further increase the layers to three or more (referred to as deep learning). Further, it is possible to perform feature extraction of input step by step and automatically acquire an arithmetic unit which regresses the results from the teacher data alone.

Referring to FIG. 2, in order to perform Q-learning, the determination value setting part 20 according to the present embodiment includes the state observation part 21, a learning part 22, and a decision-making part 25. Note that as described above, the machine learning method applied to the present invention is not limited to Q-learning. For example, when supervised learning is applied, the value function corresponds to a learning model, and the reward corresponds to an error.

The determination value setting part 20 according to the present embodiment sets an initial determination value, and then updates the determination value by reinforced learning. The determination value setting part 20 includes the state observation part 21 that obtains data on the state of the manufacturing machine, data on the environment state, and the inspection result of the product. The state observation part 21 observes each state and the inspection result of the product. Herein, determination based on the determination value corresponds to action of reinforced learning.

The determination value setting part 20 includes the learning part 22 that sets an evaluation function (action value) by learning. The learning part 22 updates the action value table based on a state amount observed by the state observation part 21. The action value table according to the present embodiment is a table containing the evaluation function as set by learning, the reward, the data on the state of the manufacturing machine, data on the environment state, and the inspection result of the product. The action value table contains a value of the variable as selected.

The learning part 22 includes a reward calculation part 23 that sets the reward for calculating the action value based on the data on the state of the manufacturing machine, data on the environment state, and the inspection result of the product. The reward calculation part 23 sets the reward based on the state amount when the product is manufactured and the inspection result. For example, when the inspection device 7a detects that an electronic component is detached or broken, the reward calculation part 23 sets the negative reward. As a result, the action value decreases, that becomes an undesired action. Further, when an electronic component is not detached or broken, the reward calculation part 23 sets the positive reward. As a result, the action value increases, that becomes a desired action.

The learning part 22 includes a function update part 24 that updates the evaluation function of action based on the data obtained by the state observation part 21 and the reward calculated by the reward calculation part 23. The function update part 24 calculates the evaluation function (action value) and updates the action value table. The determination value setting part 20 includes the decision-making part 25 that sets the determination value of the variable as selected based on the evaluation function set by the learning part 22. For example, the decision-making part 25 can select an action (determination value) having a high action value. The determination is performed based on the determination value as set.

Figure 5:
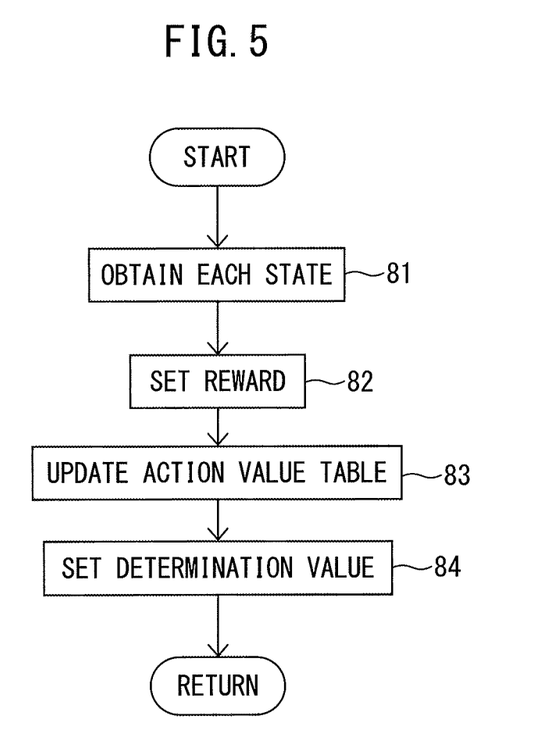
FIG. 5 is a flowchart of a control for setting a determination value according to the embodiment.

In FIG. 5, a flowchart of a control by the determination value setting part according to the present embodiment is illustrated. In an example herein, the correlation analysis part 31 determines that the variable relating to detachment or breakage of an electronic component is the amount of strain occurring in the printed circuit board.

Referring to FIG. 2 and FIG. 5, in step 81, the state observation part 21 obtains the data on the state of the manufacturing machine, data on the environment state, and the inspection result of the product. The state observation part 21 obtains the date during a period in which an operation is performed. The state observation part 21 receives the inspection result from the inspection device 7. The storage part 12 stores the data obtained by the state observation part 21.

In step 82, the learning part 22 obtains from the correlation analysis part 31 that the variable relating to detachment or breakage of an electronic component is the amount of strain occurring in the printed circuit board. The reward calculation part 23 sets the reward for calculating the action value. A method of setting the reward can be determined in advance by the operator and stored in the storage part 12.

For example, when an electronic component is not detached or broken, the reward calculation part 23 sets the positive reward. In addition, the reward calculation part 23 can calculate the reward based on a current value of the drive motor of the robot that holds the printed circuit board. For example, when a connector is mounted on the printed circuit board, the connector may not be completely mounted when a current of the motor that drives the robot is small. Thus, when the current value of the drive motor of the robot is smaller than the determination value, the reward can be decreased.

Next, in step 83, the function update part 24 calculates a value function based on the reward as calculated. Then, the function update part 24 updates the action value table based on the state amount observed by the state observation part 21 and the value function. In step 84, the decision-making part 25 sets the determination value of the amount of strain based on the action value table as updated.

Performing the control as illustrated in FIG. 5 in a repeated manner allows the determination value to be updated and the optimum determination value to be calculated. When the determination value of the amount of strain is too low, even though the product is normal, it may be determined that the amount of strain is large and there is an abnormality in the product. Further, when the determination value of the amount of strain is too large, even though the amount of strain is large so that there occurs an abnormality in the product, an operation may be continued. The determination value setting part 20 continues learning, thereby being capable of setting the proper determination value.

When the determination value of the variable as selected is determined, the cell control apparatus can perform an optional control using the determination value. For example, the product manufactured with a state of exceeding beyond the determination value can be handled as a defective product. Further, a close inspection can be conducted to the product manufactured with a state of exceeding beyond the determination value. Alternatively, based on the determination value, a control for changing either one of the state of the manufacturing machine and the environment state can be performed. Performing such control based on the determination value allows a ratio of defective products involved in the products to decrease.

Referring to FIG. 1, the production system 10 according to the present embodiment includes an external storage device 41 that is connected to the cell control apparatus 5 via a network. The external storage device 41 is configured so as to be mutually communicable with the cell control apparatus 5. The external storage device 41 can store another data different from the data on the state of the manufacturing machine, the data on the environment state, and the data on the inspection result of the product. For example, there are cases in which the products for sale involve a defective product. In the external storage device 41, data on such defective product can be stored. A defective product is provided with a product number or the like, and a state in which manufacturing is performed can be specified. The external storage device can store the data on the state of the manufacturing machine in the past, the data on the environment state in the past, and the data on an inspection result of the product in the past. The determination value setting part 20 obtains the data on the defective product from the external storage device 41. The determination value setting part 20 can set the determination value based on the data on the state of the manufacturing machine and the data on the environment state in the past at the time of manufacturing the defective product. By performing such control, large pieces of information can be used when the determination value is set so that a setting accuracy of the determination value is improved.

The determination value setting part according to the present embodiment sets the determination value by machine learning, but the embodiment is not limited to this, and the determination value setting part can set the determination value by an optional control. For example, if detachment or breakage of an electronic component occurs when the amount of strain no less than 1000 μST is applied during manufacturing of the printed circuit board, the determination value setting part may set the determination value of the amount of strain to be 800 μST slightly lower than 1000 μST.

Alternatively, the determination value setting part may set the determination value by a statistic method. For example, in the example of detachment or breakage of an electronic component as described above, the determination value setting part can employ an average value of the amount of strain of the printed circuit board when an abnormality occurs as the determination value. Alternatively, the determination value setting part may set the determination value based on a deviation of a strain value when an abnormality occurs in the printed circuit board.

In the embodiment as described above, the example in which detachment or breakage occurs in an electronic component disposed on the printed circuit board is described, but the embodiment is not limited to this, and when an abnormality is detected in the product, the determination value of an optional variable having a correlation to the abnormality can be set. For example, in manufacturing the printed circuit board, there are cases in which a recess is found in a predetermined component. In such an occasion, there are cases in which the correlation analysis part determines that an abnormality often occurs when a temperature is low. In such a case, the determination value setting part can set the determination value of the temperature. Alternatively, there are cases in which the correlation analysis part determines that an abnormality occurs when a current of the motor of the robot that holds a component is large relative to a command. In such a case, the determination value setting part can set the determination value of the current supplied to the motor of the robot.

Further, in a flow process of mounting a component on the printed circuit board by soldering, there are cases in which a solder defect occurs. There are cases in which the correlation analysis part determines that the solder defect occurs when an actual temperature of a solder furnace is somewhat lower than a value as set. In such a case, the determination value setting part can set the determination value of the temperature of the furnace.

Further, in the production system, various products are manufactured in addition to manufacturing of the printed circuit board as described above. The present invention can be applied to a production system for manufacturing an optional product. For example, there is a case of coating a predetermined component. An operation tool such as a spray gun is attached to the robot, and a body of a vehicle and the like can be coated. The operation tool for coating can jet a coating by applying a pressure to the coating material. However, in a coating process, there are cases in which the coating material is unevenly disposed or un-coated portion remains. In such a case, there are cases in which the correlation analysis part determines that a coating defect occurs when the pressure applied to the coating material in the interior of the operation tool is lower than a value as set. The determination value setting part can set the determination value of the pressure applied to the coating material. Note that when the determination value is already set to the variable as selected, the determination value setting part can perform a control of updating the determination value.

According to the present invention, the production system that can select a variable relating to an abnormality of a product that occurs during a manufacturing process and set a determination value of the variable can be provided.

In each control as described above, the order of the steps can be appropriately changed as long as the functions and effects are not changed.

The embodiments as described above can be combined as appropriate. In each drawing as described above, identical reference signs are provided to identical or equivalent parts. Note that the embodiments as described above are exemplary and not to limit the present invention. Further, in the embodiments, modifications of the embodiments recited in the claims are included.

The invention claimed is:

1. A production system comprising:
   a manufacturing machine that manufactures a product made of a plurality of components;
   a machine state detector that detects a state of the manufacturing machine;
   an environment state detector that detects an environment state around the manufacturing machine;
   an inspection device that inspects the product manufactured by the manufacturing machine; and
   a manufacturing management apparatus that is connected to a control apparatus of the manufacturing machine and a control apparatus of the inspection device, wherein
   the manufacturing management apparatus includes:
      a memory that stores data on the state of the manufacturing machine, data on the environment state, and data on an inspection result of the product;
      a processor configured to access the memory to:
         select a variable relating to an occurrence of an abnormality, wherein the selected variable is based on a correlation between the inspection result of the product, and the data on the state of the manufacturing machine and the data on the environment state when the abnormality occurs in the inspection result, wherein the variable is among a plurality of variables relating to the state of the manufacturing machine and to the environment state;
         set an initial determination value of the selected variable relating to the abnormality;
         update the initial determination value by reinforcement learning;
         obtain the data on the state of the manufacturing machine, the data on the environment state, and the inspection results of the product corresponding to the abnormality;
         set a reward for calculating an action value when the initial determination value is set based on the obtained data on the state of the manufacturing machine, data on the environment state, and the inspection result of the product;
         update an action evaluation function of an action value table based on the obtained data and the set reward; and
         set a new determination value of the selected variable based on the updated action evaluation function.

2. The production system according to claim 1, further comprising:
   an external memory that is connected to the processor of the manufacturing management apparatus via a network, wherein
   the external memory is configured so as to be capable of storing another data different from the data on the state of the manufacturing machine, the data on the environment state, and the data on the inspection result of the product, and
   the processor is further configured to set the initial determination value of the variable based on the another data.

* * * * *